Figure 1:
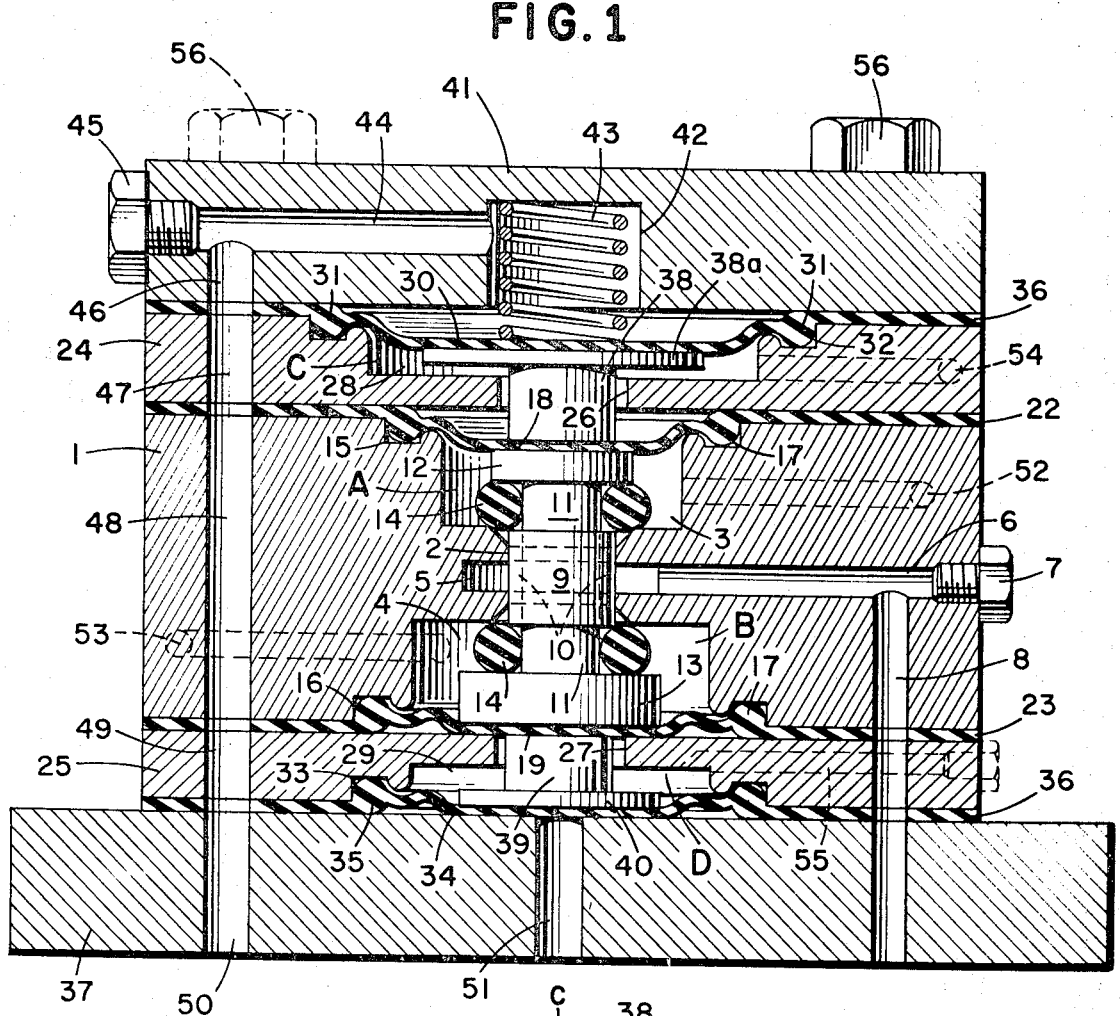

United States Patent

[11] 3,540,478

| [72] | Inventor | Jinichi Ito<br>Tokyo, Japan |
|---|---|---|
| [21] | Appl. No. | 679,386 |
| [22] | Filed | Oct. 31, 1967 |
| [45] | Patented | Nov. 17, 1970 |
| [73] | Assignee | Yamada Yuki Seizo Co. Ltd.<br>Tokyo, Japan |
| [32] | Priority | Nov. 2, 1966 |
| [33] | | Japan |
| [31] | | 41/72,519 |

[54] DIAPHRAGM TYPE PNEUMATIC LOGIC ELEMENT
2 Claims, 5 Drawing Figs.

[52] U.S. Cl. .................................................. 137/625.5;
    235/201, 251/61.5
[51] Int. Cl. ........................................... F16k 11/04
[50] Field of Search .................................. 137/625.4,
    625.5, 625.27, 625.66; 235/201 M.E; 251/61.5

[56] References Cited
UNITED STATES PATENTS

| 2,764,181 | 9/1956 | Richolt | 137/625.4X |
| 2,875,784 | 3/1959 | Cole | 137/625.5 |
| 2,991,805 | 7/1961 | Page | 235/201X |
| 3,070,295 | 12/1962 | Glattli | 235/201UX |
| 3,463,442 | 8/1969 | Leskiwicz et al. | 137/625.66X |

Primary Examiner—M. Cary Nelson
Assistant Examiner—Michael O. Sturm
Attorney—Stevens, Davis, Miller and Mosher ABSTRACT: A diaphragm-type pneumatic logic element comprising a pneumatic logic operator, valve portions having pressure receiving faces different from each other in diameter and provided on opposite ends of said operator, diaphragms facing said pressure receiving faces provided for operating the operator, air chambers formed at the outer and inner sides of said diaphragms for receiving input signals of high-pressure air, and an air duct for taking out an output signal of high-pressure air.

Patented Nov. 17, 1970

3,540,478

INVENTOR
JINICHI ITO

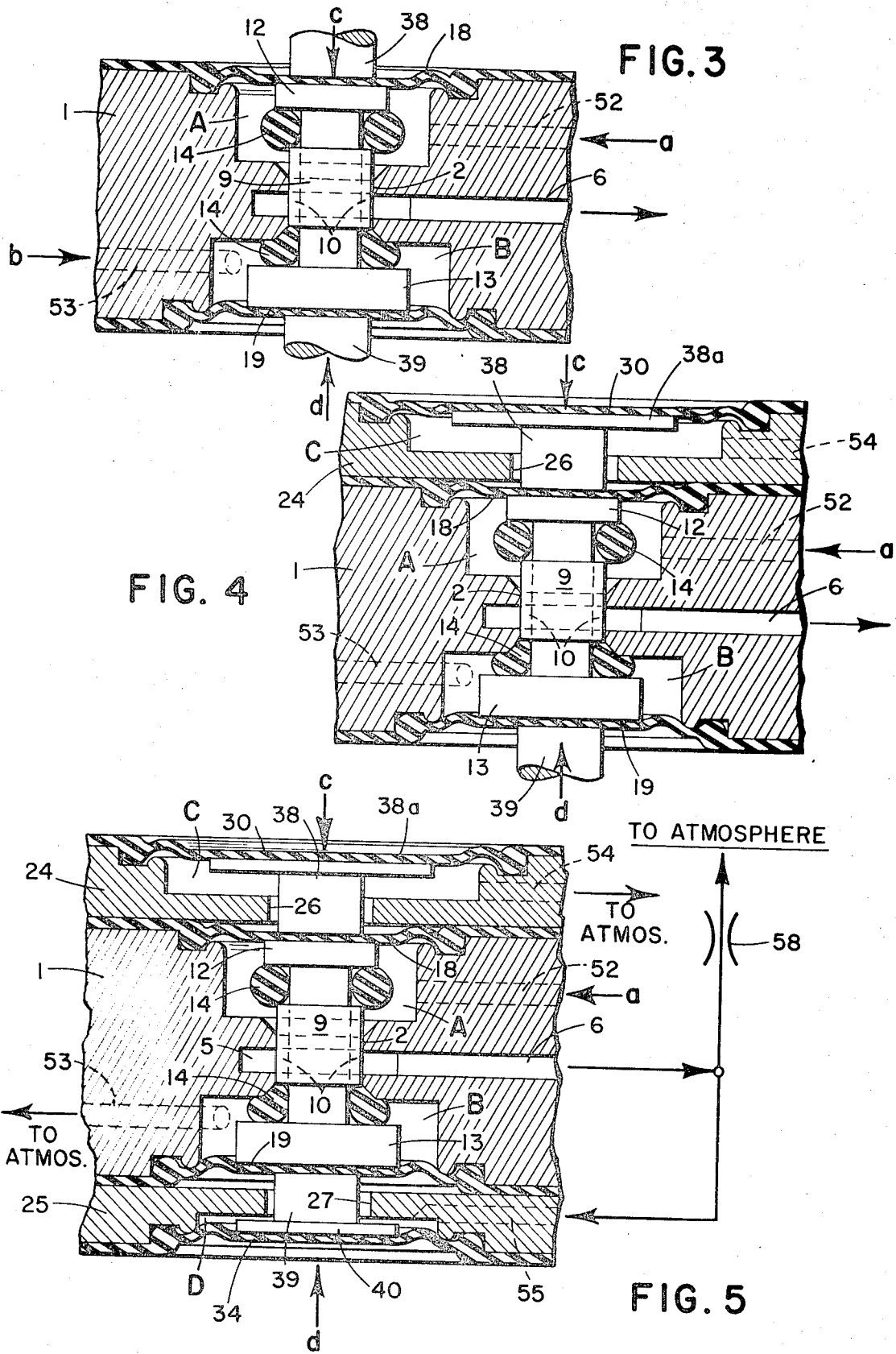

3,540,478

DIAPHRAGM TYPE PNEUMATIC LOGIC ELEMENT

This invention relates to a pneumatic logic element, more particularly to a diaphragm type pneumatic logic element.

Generally, in cases where the switching frequency of a pneumatic logic element is high, the leakage air from the element and the static properties thereof can be disregarded in comparison with the exhaust capacity (including a capacity of the circuit) because the air consumption during switching follows the exhaust capacity of the element. In cases where the switching frequency of the pneumatic logic element is low, however, for example, in case of process control and the like controlled hourly, a diaphragm-type logic element is required which has no dynamic loss in a static state even if a performance of exhaust capacity to switching speed is lowered somewhat at switching of the element.

One object of this invention is to provide a diaphragm-type pneumatic logic element which satisfies the above requirements.

Another object of this invention is to provide a diaphragm-type pneumatic logic element which is simple in construction and has a high reliability.

A further object is to provide a diaphragm-type pneumatic logic element fabricated by stacking a plurality of members with alternate small diaphragms.

In accordance with one aspect of the invention, the objectives are achieved by means of a novel diaphragm-type pneumatic logic element characterized in that concentric valve portions, which are different from each other in diameter, are provided at each end of a pneumatic logic operator which reciprocates in a cylinder, diaphragms for operating said pneumatic logic operator are formed coaxially with said operator, and output control can be accomplished by reciprocating said operator by input signals depending on a high-pressure air applied to the outer and inner surfaces of said diaphragms.

Other objects and advantages of this invention will further become apparent from the following specification with reference to the drawings in which:

FIG. 1 is a longitudinal sectional view of a diaphragm-type pneumatic logic element of one embodiment of this invention; and FIGS. 2 to 5 are schematic views for explaining the operations of the element shown in FIG. 1.

Turning now to the specific embodiment of the invention selected for illustration in the drawings, numeral 1 designates a main body made of synthetic resin or metal in the shape of a square pillar or cylinder, through which a cylindrical bore 2 is provided axially. Enlarged chambers 3 and 4, which are larger in diameter than the cylindrical bore 2, are formed concentrically at the upper and lower open ends of said cylindrical bore 2. The enlarged chamber 4 of the lower end is larger in diameter than the enlarged chamber 3 of the upper end. At the middle of the cylindrical bore 2, there is provided an annular groove 5 which is in communication with an air duct 6 provided horizontally through the main body 1 and opening at the outer side face of the main body 1. This opening of the air duct 6 is closed by threaded plug 7. Another air duct 8 is provided vertically in the main body 1 with one end in communication with air duct 6 and the other end is opening at the lower face of the main body 1.

A plurality of grooves 10 are formed axially on the peripheral surface of a pneumatic logic operator 9 inserted into the cylindrical bore 2 so as to reciprocate freely. The piston 9 has portions 11 of reduced diameter at the both ends thereof. Pressure-receiving pistons 12 and 13 of enlarged diameter are provided concentrically at each end of the reduced portions 11. The pressure-receiving piston 12 at the upper end is smaller in diameter than the pressure-receiving piston 13 at the lower end. Ring-shaped valve members 14 are mounted about each reduced portion 11 of the operator 9.

Annular grooves 15 and 16 are provided, concentrically with said cylindrical bore 2, adjacent the outer periphery edge portions of the enlarged chambers 3 and 4, respectively, with the lower annular groove 16 being larger in diameter than the upper annular groove 15. Thickened engaging ridges 17 provided about the peripheral edges of diaphragms 18 and 19 engage with grooves 15 and 16, respectively, to form air chambers A and B defined by the diaphragms 18 and 19 and enlarged chambers 3 and 4. Packing gasket flanges 22 and 23 are provided integrally on the outer peripheral edges of the diaphragms 18 and 19 and are superposed on the upper and lower faces of the main body 1, respectively.

Auxiliary upper and lower bodies 24 and 25, respectively, made of synthetic resin or metal, are stacked on the upper and lower faces of the main body 1 against the packing gasket flanges 22 and 23. Cylindrical bores 26 and 27 are formed in said upper and lower auxiliary bodies, respectively, concentrically with the cylindrical bore 2 of the main body 1 and also enlarged chambers 28 and 29, which are larger in diameter than the respective bores 26 and 27, are provided at the outsides of said bodies 24 and 25, respectively. The enlarged chamber 28 of the upper auxiliary body is larger in diameter than the enlarged portion 29 of the lower auxiliary body. The upper face of the auxiliary body 24 has an annular groove 32 concentric with the cylindrical bore 26 and into which a thickened engaging flange 31, provided about the peripheral edge of a diaphragm 30, engages. An air chamber C is defined by the enlarged chamber 28 and diaphragm 30. The lower face of the auxiliary body 25 is provided with an annular groove 33 into which a thickened engaging flange 35 of a diaphragm 34 is engaged. An air chamber D is defined by the enlarged chamber 29 and diaphragm 34. Packing gasket flanges 36 are formed integrally on the outer periphery of both diaphragms 30 and 34. A base plate 37 is fixed on the lower face of lower auxiliary body 25 against packing gasket 36. Push members 38 and 39 are provided to reciprocate in the cylindrical bores 26 and 27, respectively, with their inner ends against diaphragms 18 and 19 and their outer ends against diaphragms 30 and 34 through pressure-receiving portions 38a and 40, respectively. The pressure-receiving portion 38a is larger in diameter than a pressure-receiving portion 40.

A cover 41, made of synthetic resin or metal, is stacked on the upper face of the auxiliary body 24 via packing gasket 36. On the lower face of the cover, a cylindrical recess 42 is provided. A spring 43 is inserted into the cylindrical recess 42 for biasing the push member 38 towards the operator 9 through said diaphragm 30. An air duct 44 is provided horizontally through the cover 41 with one end opening at the side face of the cover 41 and the other end communicating with the cylindrical recess 42. The open end of the air duct 44 is closed by a threaded plug 45. The air duct 44 is further in communication with a duct 50 provided in the base plate 37 via a vertical duct 46 in the cover 41, a duct in the upper packing gasket 36, a vertical duct 47 through the auxiliary body 24, a duct in the packing gasket 22 a vertical duct 48 through the main body 1, a duct in the packing gasket 23, a vertical duct 49 through the auxiliary body 25, and a duct in the lower packing gasket 36.

A vertical air duct 51 is provided through the base plate 37 to communicate with push member 39 via the diaphragm 34.

Air ducts 52, 53, 54 and 55 are provided in the main body 1 and auxiliary bodies 24 and 25, respectively, in communication with the air chambers A, B, C and D, the other ends of said ducts being open at the side face of the main body 1 and auxiliary bodies 24 and 25.

The stacked main body 1, auxiliary bodies 24 and 25, cover 41 and base plate 37 are suitably fixed by bolt means 56.

The operation of the aboved-described logic element of this invention will be explained hereunder.

Figure 2:
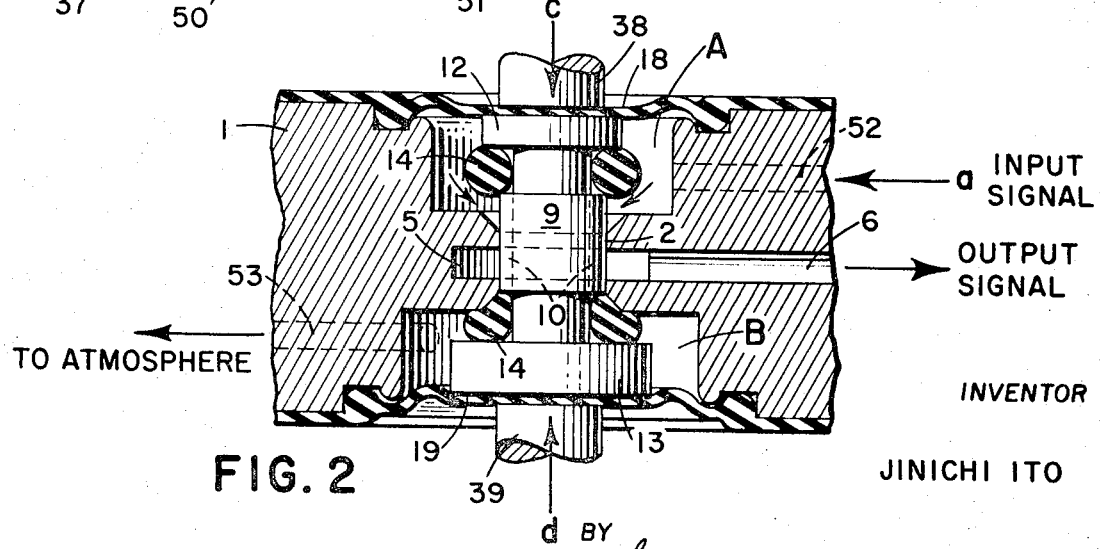

In cases when the logic element of this invention is used as an AND circuit, by always applying a pressure signal to the air chamber A, high pressure air signals equal to one another in pressure are applied to the air chambers C and D at the outer side of the inner diaphragms 18 and 19 and to the chamber A at the inner side of the diaphragm 18 through the air ducts 54, 55 and 52, respectively. As the result, the operator 9 is caused to move upwardly in the cylindrical bore 2 against the force of the spring 43 because the pressure-receiving piston 13 of the lower end of the operator 9 is larger in area than the pressure-receiving piston 12 of the operator 9 and therefore a force moving the operator 9 upwardly is generated, as shown in FIG. 2. In this state, the air chamber B at the inner side of the diaphragm 19 is connected to the atmosphere. According to the upward motion of the operator 9, the lower open end of the cylindrical bore 2 is closed by the ring-shaped lower valve member 14 acting as a seal packing, the upper end of the cylindrical bore 2 is opened by displacing the ring-shaped upper valve member 14 therefrom, the air chamber A is placed into communication with the air duct 6 connected to the cylindrical bore 2 through the grooves 10 formed on the periphery of the operator 9, and the high pressure air signal applied to the air chamber A is discharged from the air duct 6, as an output air signal, so that an output signal of high-pressure air can be obtained from the input signals $a$ and $d$ of high-pressure air applied to the air chambers A and D. The air pressure applied to the air chamber A is a flowing pressure, and it does not produce a force for urging the operator 9 downwardly against the pressure applied to the diaphragm 19 and the high pressure supplied to the air chamber A is developed as the output signal.

When the supply of the high pressure air to the air chamber A is discontinued, the output signal is interrupted and when the high-pressure air of the air chamber D is discharged, the pressure applied to the diaphragm 19 is interrupted so that the operator 9 is returned immediately downwardly by high-pressure air applied to the upper side of the diaphragm 30 and the force of the spring 43. In accordance with the downward motion of the operator 9, the upper open end of the cylindrical bore 2 is closed by the upper ring-shaped valve member 14, and the lower open end of the cylindrical bore 2 is opened by the lower valve member 14. However, no output signal is developed because the air chamber B is connected to the atmosphere. As mentioned above, when either one of said input signals $a$ and $d$ of high-pressure air supplied to the air chambers A and D is discontinued, the output signal is interrupted.

In cases when the logic element is used as an OR circuit, a pressure signal is always applied to the air chamber A and, as shown in FIG. 3, high-pressure air signals are supplied to the air chambers C and D at the outside of the inner diaphragms 18 and 19. Consequently, the operator 9 is caused to move upwardly and an output signal of high-pressure air is derived from the air duct 6 when high-pressure air is applied to the air chamber A through the air duct 52. When the input signal $d$, which depends on the pressure air of the air chamber D, is interrupted, the operator 9 is returned downwardly by the pressure in the air chamber C and the connection between the air chamber A and air duct 6 is cut off; therefore, the output signal is suspended. In this state, if an input signal $b$ of high-pressure air is applied to the air chamber B, the air is delivered from the air chamber B to the air duct 6 and an output signal is obtained because the air chamber A closed off from the cylindrical bore 2 by the upper valve member 14 and the lower open end of the cylindrical bore 2 is connected to the air duct 6 through the grooves 10 formed on the operator 9. It will be apparent from the foregoing that an output signal is generated when either one of the input signals $d$ or $b$ is applied.

In cases where the logic element is used as a NOT circuit, as shown in FIG. 4, a pressure signal is always supplied to the air chamber A and input signal $d$ of high pressure air is supplied to the air chamber D from the air duct 55. As the result, the operator 9 is lifted by the action of the diaphragm 19, the lower open end of the cylindrical bore 2 is closed as in the above-described cases, and the upper open end of the cylindrical bore 2 is placed in communication with the air chamber A, so that an output signal is obtained in such a way that the high-pressure air of the air chamber A at the inside of the diaphragm 18 from the air duct 52 is supplied to the air duct 6 through the grooves 10 of the operator 9. In this state, the air chambers B, C and air duct 44 are opened to the atmosphere.

When a denial signal of high-pressure air, similar to said input signal $d$ in pressure, is applied to the outside of the diaphragm 30 from the air duct 44, the operator 9 is caused to move downwardly by the push member 38 against the force applied thereto, because the pressure-receiving portion 38a of the push member 38 is larger in area than the pressure-receiving piston 13 of the operator 9. According to the downward motion of the operator 9, the upper open end of the cylindrical bore 2 is closed by the upper valve member 14 and the output signal is interrupted. Accordingly, the output signal obtained by the input signal $d$ is disconnected depending on the denial signal.

In cases where the logic element is used as a flip-flop circuit, a pressure signal is always applied to the air chamber A and, as shown in FIG. 5, a set signal of high-pressure air is applied to the outside of the diaphragm 34 through the air duct 51, so that the push member 39 is pushed by the diaphragm 34, which in turn pushes the operator 9 through the diaphragm 19 and the high pressure air of the air chamber A is delivered through the air duct 6 as an output signal. In this instance, a portion of the output signal from the air duct 6 is supplied to the air chamber D as an input feed back signal through the air duct 55 and pushes the operator 9 via the diaphragm 19 to thereby hold the operator 9 in an upper position. In this state, a throttle valve 58 is provided in the duct for the output signal and the air chambers B and C and air duct 44 are connected to the atmosphere. The output signal obtained by the set input signal $d$ is, therefore, held by the feed back signal of a portion thereof, so that the output signal can be obtained continuously. When a reset signal of high-pressure air is applied to the outside of the upper diaphragm 30 through the air duct 44, the push member 38 is pushed by the diaphragm 30, which in turn pushes the operator 9 downwardly because the pressure-receiving portion 38a of the push member 38 is larger in area than the pressure-receiving piston 12 of the operator 9. In accordance with the descending of the operator 9, the output signal is interrupted and the air duct 55 is connected to atmosphere, thus the reset state is effected.

As stated above, according to this invention a logic element can be manufactured easily because the pneumatic logic operator and diaphragms for operating the pneumatic logic operator are arranged so as to be spaced apart from each other on an axial line in the reciprocating direction of the pneumatic operator. By suitably setting the connection between ducts and air chambers formed at the inner and outer sides of the diaphragms, AND, OR, NOT or flip-flop circuits which are simple in construction and have high reliability necessary for pneumatic logic elements can be made easily. Further, the pneumatic logic element according to this invention has little power loss in the static state even when it is used for a control in which the switching frequency is low, for example, in a process control controlled every hour.

I Claim: 1. A diaphragm type pneumatic logic element comprising a housing having a central axial bore, a pneumatic logic operator movably and reciprocately mounted in said bore, concentric valve means having pressure receiving faces different in diameter from each other and provided on opposite ends of said operator, diaphragm means adjacent each of said pressure receiving faces provided coaxially with said operator and independently of each other for operating the operator, push member means opposing each end of said operator and adjacent diaphragm means and having receiving faces different from each other in area and coaxial with said operator, diaphragm means facing said pressure receiving faces of both push members provided coaxially with said operator air chambers formed at the outer and inner sides of each of said diaphragm means, means for selectively supplying input signals of high-pressure air to said air chambers, and an air duct for taking out an output signal of high-pressure air.

2. A diaphragm type pneumatic logic element comprising a housing having a central axial bore, a pneumatic logic operator movably and reciprocately mounted in said bore, concentric valve means having pressure receiving faces different in diameter from each other provided on opposite ends of said operator, diaphragm means contacting each said pressure receiving face coaxially with said operator and independently of each other for operating the operator, push member means having pressure receiving faces different from each other in area and provided coaxially with said operator to contact said pressure receiving faces of the operator, through said diaphragm means, diaphragm means adjacent said pressure receiving faces of both push members provided coaxially with said operator, air chambers formed at the outer and inner sides of each said diaphragm means, means for selectively supplying input signals of high-pressure air to said air chambers, an air duct for taking out an output signal of high-pressure air, and a signal composed of a portion of said output signal for holding the operation of said operator.